United States Patent [19]

Martin

[11] Patent Number: 4,511,727

[45] Date of Patent: Apr. 16, 1985

[54] QUATERNARY AMMONIUM-FUNCTIONAL SILICON COMPOUNDS

[75] Inventor: Eugene R. Martin, Adrian, Mich.

[73] Assignee: SWS Silicones Corporation, Adrian, Mich.

[21] Appl. No.: 447,547

[22] Filed: Dec. 7, 1982

Related U.S. Application Data

[62] Division of Ser. No. 380,493, May 21, 1982, Pat. No. 4,384,130.

[51] Int. Cl.³ .............................. C07F 7/08; C07F 7/10
[52] U.S. Cl. ..................................... 556/418; 556/419
[58] Field of Search ................................ 556/418, 419

[56] References Cited

U.S. PATENT DOCUMENTS

| | | | |
|---|---|---|---|
| 2,415,017 | 1/1947 | MacKenzie | 556/419 X |
| 2,637,623 | 5/1953 | Janes | 556/419 X |
| 2,838,423 | 6/1958 | Gilkey | 556/419 X |
| 3,700,844 | 10/1972 | Domba | 556/419 X |
| 3,734,763 | 5/1973 | Plueddemann | 556/419 X |
| 3,819,675 | 6/1974 | Plueddemann | 556/418 X |
| 4,312,993 | 1/1982 | Martin | 556/419 |
| 4,342,742 | 8/1982 | Sebag | 556/418 X |

*Primary Examiner*—Paul F. Shaver

[57] ABSTRACT

Quaternary ammonium-functional silicon compounds are prepared by reacting carboxylic acid-functional quaternary ammonium compounds with carbinol-functional silicon compounds. These quaternary ammonium-functional silicon compounds may be applied to textile materials to impart antistatic properties thereto.

8 Claims, No Drawings

QUATERNARY AMMONIUM-FUNCTIONAL SILICON COMPOUNDS

This is a division of application Ser. No. 380,493, filed May 21, 1982, now U.S. Pat. No. 4,384,130.

The present invention relates to quaternary ammonium compounds and more particularly to quaternary ammonium-functional silicon compounds and their use as antistatic agents for textile materials.

BACKGROUND OF THE INVENTION

Quaternary ammonium silicon compounds have been described, for example, in U.S. Pat. No. 3,471,541 to Morehouse, in which a tertiary amine is prepared by reacting an alkenyl ether of a tertiary hydroxy polyalkyleneoxy alkylamine with a hydrosilicon compound (i.e., a silane or siloxane containing silicon-bonded hydrogen) in the presence of a platinum catalyst. The resultant tertiary amines are then reacted with hydrocarbyl halides, monocarbylic acids or hydrocarbyl esters of haloalkanoic acids to form the corresponding quaternary ammonium silicon compounds.

U.S. Pat. No. 3,661,963 to Pepe et al describes quaternary ammonium salts of chloromethylated silanes or siloxanes which are useful as antistatic agents. The quaternary ammonium salts are prepared by reacting a tertiary amine of the formula $R_3N$, where R is a monovalent organic radical, with a chloromethylarylsilane or a chloromethylaralkylsilane.

U.S. Pat. No. 3,734,763 to Plueddemann describes cationic unsaturated amine functional silane coupling agents which can be applied to glass fibers to minimize the build-up of static charge on the fibers. These amine functional silane coupling agents can be prepared by reacting conjugated unsaturated alkyl halides with an aminofunctional silane.

In contrast to the quaternary ammonium silicon compounds described above, the quaternary ammonium-functional silicon compounds of the present invention impart antistatic properties to textile materials which withstand repeated washings. Moreover, the quaternary ammonium-functional silicon compounds, especially the quaternary ammonium-functional organopolysiloxanes are prepared from commercially available materials.

Therefore, it is an object of this invention to provide a process for preparing novel quaternary ammonium-functional silicon compounds. Another object of this invention is to provide quaternary ammonium-functional silicon compounds which impart antistatic properties to textile materials. Still another object of this invention is to provide quaternary ammonium-functional silicon compounds which adhere to textile materials after repeated washings. A further object of this invention is to provide a process for preparing quaternary ammonium-functional organopolysiloxanes which impart antistatic properties to textile materials.

SUMMARY OF THE INVENTION

The foregoing objects and others which will become apparent from the following description are accomplished in accordance with this invention, generally speaking, by providing a process for preparing quaternary ammonium-functional silicon compounds which comprises reacting carboxylic acid-functional quaternary ammonium compounds with carbinol-functional silicon compounds. These compositions may be applied to textile fibers to provide antistatic properties.

DETAILED DESCRIPTION OF THE INVENTION

The carboxylic acid-functional quaternary ammonium compounds which are reacted with the carbinol-functional compounds may be represented by the formulas

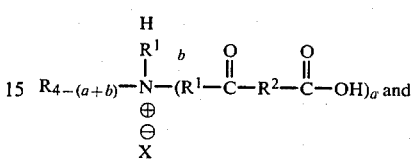

and

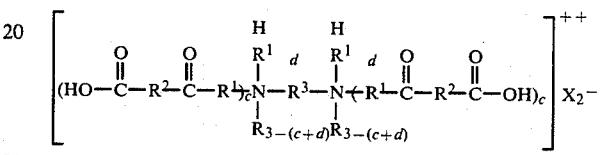

wherein R which may be the same or different is a monovalent hydrocarbon radical having from 1 to 22 carbon atoms, $R^1$ is a hydrocarbonoxy radical represented by the formula

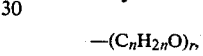

in which the terminal carbon atom is linked to the nitrogen atom, $R^2$ which may be the same or different is a divalent hydrocarbon radical selected from the group consisting of $(CH_2)_y$, $CH=CH$, a cyclic divalent hydrocarbon radical selected from the group consisting of $C_3H_4$, $C_4H_6$, $C_5H_8$, $C_6H_4$, $C_6H_8$, $C_6H_{10}$ and $C_{10}H_6$, or a bicyclic radical selected from the group consisting of $C_7H_8$, $C_7H_{10}$, $C_8H_{10}$ and $C_8H_{13}$, $R^3$ is a divalent hydrocarbon radical having from 2 to 10 carbon atoms, X is an anionic radical, a is a number of from 1 to 4, b is a number of from 0 to 3, c is a number of from 1 to 3, d is a number of from 0 to 2, in which the sum of a+b cannot exceed 4 and the sum of c+d cannot exceed 3, n is 2, 3 or 4, r is a number of from 1 to 50, and y is a number of from 0 to 10.

The carboxylic acid-functional quaternary ammonium compounds may be prepared by reacting carbinol-functional quaternary ammonium compounds of the formulas

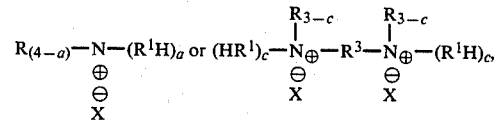

where R, $R^1$, $R^3$, X, a and c are the same as above, with dicarboxylic acids or cyclic anhydrides thereof to form the carboxylic acid-functional quaternary ammonium compounds.

The resultant carboxylic acid-functional quaternary ammonium compounds are then reacted with carbinol-functional silicon compounds having units of the general formula

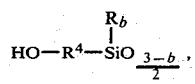

where R and b are the same as above, $R^4$ is selected from the group consisting of saturated divalent hydrocarbon radicals and divalent hydrocarbonoxy radicals in which the oxygen is in the form of an ether linkage.

The carbinol-functional silicon compounds may also contain siloxane units of the formula

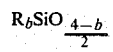

where R and b are the same as above, in which the siloxanes may be endblocked with silanol, alkoxy, aryloxy or triorganosiloxy groups.

The carboxylic acid-functional quaternary ammonium compounds are reacted with the carbinol-functional silicon compounds at a temperature of from about 0° C. up to about 175° C. and more preferably from about 25° C. to about 140° C. It is preferred, although it is not essential, that the reaction be conducted in the presence of a non-protic solvent. Suitable examples of non-protic solvents are aliphatic hydrocarbons such as hexane and heptane; aromatic hydrocarbons such as benzene, toluene and xylene; ethers such as diglyme and diethyl ether; chlorinated hydrocarbons such as, 1,1,1 trichloroethane, perchloroethane and carbon tetrachloride.

Although the reaction time may vary over a broad range, it is preferred that the reaction time be limited when the reaction temperature is above about 100° C. in order to avoid degradation of the quaternary ammonium compound.

The mole ratio of the carboxylic acid group linked to the quaternary ammonium compound to carbinol group linked to the silicon compound may vary over a wide range, e.g., from about 4:1 to 1:30, with the proviso that at least one carboxylic acid group is reacted with one carbinol group.

After the completion of the reaction the solvent may be removed at a temperature of from about 25° to 150° C., preferably at reduced pressure.

The reaction between the carboxylic acid-functional quaternary ammonium compound and carbinol-functional silicon compound forms an ester and water. The water by-product may be removed either by vacuum stripping or as an azeotrope when the reaction is conducted in the presence of a non-protic solvent.

A catalyst may be employed to accelerate the reaction between the carboxylic acid-functional quaternary ammonium compound and the carbinol-functional silicon compound. Examples of suitable catalysts are bases such as alkali metal hydroxides and alkoxides; titanates such as titanium tetrachloride and organic tin compounds such as dibutyltin dilaurate, organic acids having a pKa value of less than 1.0 and inorganic acids. Generally, a catalyst level of from about 0.1 percent to 10 percent, based on the weight of the reactants will accelerate the reaction.

The carbinol-functional silicon compounds may be prepared, for example, by reacting silanes containing at least one unsaturated alkoxy group, such as triorganoalkenyloxysilanes, e.g., trimethylallyloxysilanes with a silicon compound containing at least one Si-bonded hydrogen in the presence of a platinum catalyst.

The resultant product containing, for example, the trimethylpropoxy group, is then reacted with water to form the carbinol-functional group.

The carboxylic acid-functional quaternary ammonium compounds employed in this invention may be prepared by reacting dicarboxylic acids or cyclic anhydrides thereof with the carbinol-functional quaternary ammonium compounds at a temperature of from about 50° to 175° C. and more preferably at a temperature of from about 75° to 150° C. Generally, it is preferred that the reaction be conducted in the presence of non-protic solvents.

The same non-protic solvents described above may be used in preparing the carboxylic acid-functional quaternary ammonium compounds. The solvent may be removed in vacuum at 25° to 150° C.

The mole ratio of cyclic anhydride to carbinol group bonded to the quaternary ammonium compounds may vary over a wide range. For example, the mole ratio of cyclic anhydride to carbinol group may range from 1:1 to 1:4 with the proviso that at least one carbinol group is reacted with the cyclic anhydride molecule.

When dicarboxylic acids are reacted with the carbinol-functional quaternary ammonium compounds, then it is preferred that the reaction be conducted in the presence of a non-protic solvent which is capable of azeotroping with the water byproduct. The solvent may then be removed in vacuum at 25° to 150° C.

The same catalysts may be employed to accelerate the reaction between the dicarboxylic acid and the carbinol-functional quaternary ammonium compounds as was used to promote the reaction between the carboxylic acid-functional quaternary ammonium compound and the carbinol-functional silicon compound. Generally, a catalyst level of from about 0.1 percent to 10 percent, based on the weight of the reactants will accelerate the reaction.

The mole ratio of carboxylic acid group to carbinol group bonded to the quaternary ammonium compounds may vary over a wide range. For example, the mole ratio of carboxylic acid group to carbinol group may range from about 8:1 to 2:1, with the proviso that at least one carboxylic acid group is reacted with one carbinol group.

Suitable examples of dicarboxylic acids which may be employed to form the carboxylic acid-functional quaternary ammonium compounds are oxalic acid, malonic acid, succinic acid, glutaric acid, phthalic acid, adipic acid, pimelic acid, suberic acid, azelaic and sebacic acid. Suitable examples of cyclic anhydrides are succinic anhydride, glutaconic anhydride, maleic anhydride, 1,2 cyclohexane dicarboxylic anhydride, 1-cyclohexene-1,2-dicarboxylic anhydride, 3-cyclohexene-1,2-dicarboxylic anhydride, 4-cyclohexene-1,2-dicarboxylic anhydride, 1,8-naphthalic acid anhydride and phthalic anhydride.

The carbinol-functional quaternary ammonium compounds may be prepared by conventional processes known in the art. For example, they may be prepared by reacting an alkyl halide containing at least one carbinol group with an amine or ammonia.

The counter-ion in the carbinol-functional quaternary ammonium compound can be any anionic group. Suitable examples of anionic groups are halogens, such as chlorine, fluorine, iodine and bromine; methyl sulfate and phosphate anions.

Suitable examples of monovalent hydrocarbon radicals represented by R are alkyl radicals, such as methyl, ethyl, propyl, butyl, hexyl, octyl, decyl, dodecyl, hexadecyl, octadecyl radicals; alkenyl radicals such as the vinyl, allyl as well as octadecenyl radicals; aryl radicals such as phenyl and naphthyl radicals; alkaryl radicals such as, tolyl, xylyl and ethylphenyl radicals; cycloalkyl radicals such as cyclobutyl, cyclohexyl and cyclodecyl radicals; aralkyl radicals such as benzyl, 2-phenylethyl and 2-phenylpropyl radicals.

Examples of suitable divalent hydrocarbonoxy radicals represented by $R^1$ are radicals of the formula $$(C_nH_{2n}O)_r$$

where the terminal carbon atom is linked to the nitrogen atom, r is an average number of from 1 to 50, and n is 2, 3, or 4.

Examples of suitable divalent hydrocarbon radicals represented by $R^1$, and $R^2$ having up to 10 carbon atoms are methylene, ethylene, trimethylene, tetramethylene, pentamethylene, hexamethylene, octamethylene and decamethylene radicals. Examples of divalent aryl radicals are phenylene, cyclohexenylene and naphthenylene. Examples of suitable divalent hydrocarbon radicals represented by $R^3$ are ethylene, trimethylene, tetramethylene, pentamethylene, hexamethylene, octamethylene and decamethylene radicals.

Examples of suitable divalent radicals represented by $R^4$ are hydrocarbon radicals such as ethylene, trimethylene, hexamethylene, and octamethylene radicals and hydrocarbonoxy containing radicals of the formula $$(C_2H_4O)_r(CH_2)_z, (C_3H_6O)_4(CH_2)_z \text{ and } (C_4H_8O)_r(CH_2)_z$$

where r is from 1 to 50 and z is a number of from 1 to 10.

The quaternary ammonium-functional silicon compounds may be mixed with various diluents. Examples of suitable diluents are organic solvents such as alcohols, e.g., ethanol and 1-propanol; aliphatic hydrocarbon solvents such as heptane and iso-octane; aromatic hydrocarbon solvents such as toluene and xylene and chlorinated hydrocarbon solvents such as chloroform and 1,1,1-trichloroethane. Other diluents are organopolysiloxanes having a viscosity up to 100,000 mPa.s at 25° C., such as hexamethyldisiloxane, and dimethylpolysiloxanes; cyclic siloxanes such as octamethylcyclotetrasiloxane; organofunctional polysiloxanes such as aminofunctional polysiloxanes, mercaptofunctional polysiloxanes and carboxylic acid-functional polysiloxanes.

Also, the quaternary ammonium-functional silicon compounds may be combined with a diluent such as water.

The quaternary ammonium-functional silicon compounds of this invention may be used to treat textile materials to impart antistatic properties thereto.

These quaternary ammonium-functional silicon compounds may be applied to textile fabrics in concentrated form or in the presence of a diluent. The amount of quaternary ammonium-functional silicon compound present in the diluent may range from about 0.25 to 99 percent, preferably from about 2 to 50 percent by weight based on the weight of the quaternary ammonium-functional silicon compound and the diluent.

The quaternary ammonium-functional silicon compounds of this invention, and if desired other substances, may be applied to all textile materials, preferably organic textile materials on which organopolysiloxanes have been or could have been applied heretofore. Examples of such textile materials are wool, cotton, rayon, hemp, natural silk, polypropylene, polyethylene, polyester, polyurethane, polyamide, cellulose acetate, polyacrylonitrile fibers, and mixtures of such fibers. The textile materials may consist of staple fibers or monofilaments.

The quaternary ammonium-functional silicon compounds of this invention and other substances, if desired, may be applied to the textile materials by any means known in the art, such as by spraying, immersion, padding, calendering or by gliding the fibers across a base which has been saturated with the quaternary ammonium-functional silicon compounds of this invention and other materials, if desired.

Generally, the solids add-on is in the range of from 0.001 to 20 percent and more preferably from about 0.05 to 10 percent, based on the original weight of the textile material.

After the textile material has been treated, it is dried at an elevated temperature, e.g., from about 50° to 200° C. for a brief period of time, e.g., from about 3 to 15 minutes.

Specific embodiments of this invention are further illustrated in the following examples in which all parts and percentages are by weight unless otherwise specified.

EXAMPLE 1

(a) Preparation of carboxylic acid-functional quaternary ammonium compound.

To a reactor containing 320 parts of a carbinol-functional quaternary ammonium compound represented by the formula

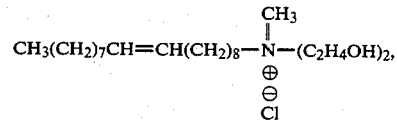

is added 150.8 parts of succinic anhydride and 925 parts of toluene and heated for 10 hours at 100° C. The toluene is then removed in vacuum for 2 hours at 100° C. The resultant product is a dark, amber, gum-like polymer having an acid content of 3.25 milliequivalents/g (calculated 3.3 milliequivalents/g). Infrared analysis of the product shows the absence of succinic anhydride.

(b) Preparation of quaternary ammonium-functional silicon compound:

To a reactor containing 235 parts of the above carboxylic acid-functional quaternary ammonium compound is added 852 parts of a carbinol-functional silicone fluid represented by the formula

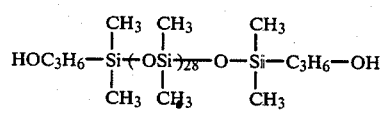

and heated in vacuum at 100° C. for 24 hours. About 12 parts of water are collected in a flask cooled in dry ice. The resultant product is an amber, opaque gum having a nitrogen content of 0.45 percent (calculated 0.48 percent) and a hydrolyzable chloride content of 1.1 percent, (calculated at 1.2 percent).

EXAMPLE 2

(a) Preparation of a carboxylic acid-functional quaternary ammonium compound:

To a reactor containing 320 parts of a carbinol-functional quaternary ammonium compound having the formula

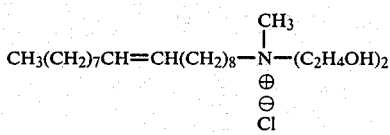

is added 365.2 parts of 1,12-dodecanedioic acid and 925 parts of xylene and refluxed until about 27 parts of water are azetroped off. The reaction mixture is then cooled to room temperature. The acid content of the resultant solution is 0.9 milliequivalents/g (calculated 0.96 milliequivalents/g). The chloride content is 1.6 percent (calculated 1.8 percent) and the nitrogen content of the resultant product is 0.6 percent, (calculated 0.7 percent).

(b) Preparation of quaternary ammonium-functional silicon compound.

To a reactor containing 625 parts of the carboxylic acid-functional quaternary ammonium compound and 925 parts of xylene prepared in Example 2(a) above, is added 1841 parts of a carbinol-functional polydimethylsiloxane represented by the formula

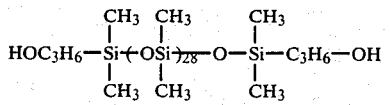

and refluxed until about 27 parts of water are azeotroped off. The product is stripped at 150° C. for 3.0 hours to remove the xylene. The resultant product is an amber gum having a nitrogen content of 0.39 percent (calculated 0.44 percent) and a chloride content of 1.0 percent, (calculated 1.1 percent). Infrared analysis indicates that the product is a quaternary ammonium-functional silicon compound.

EXAMPLE 3

(a) Preparation of a carboxylic acid-functional quaternary ammonium compound.

To a reactor containing 320 parts of a carbinol-functional quaternary ammonium compound having the formula

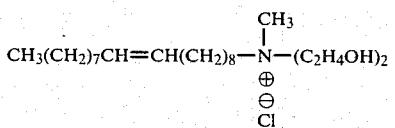

is added 232 parts of adipic acid and 925 parts of xylene and refluxed until about 27 parts of water are azeotroped off. The reaction mixture is then cooled to room temperature. The acid content of the resultant solution is 1.0 milliequivalents/g, (calculated 1.08 milliequivalents/g).

(b) Preparation of quaternary ammonium-functional silicon compound.

To a reactor containing 520 parts of the carboxylic acid-functional quaternary ammonium compound and 925 parts of xylene prepared in Example 3(a) above, is added 920.5 parts of a carbinol-functional polydimethylsiloxane represented by the formula

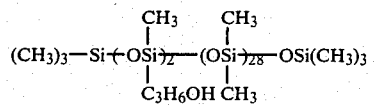

and refluxed until about 27 parts of water are azeotroped off. The product is vacuum stripped at 150° C. for 3.0 hours to remove the xylene. The resultant product is an amber, opaque liquid having a viscosity of about 40,000 mPa.s at 25° C. The product contains about 0.7 percent nitrogen (calculated 0.75 percent) and has a chloride content of 1.8 percent (calculated 1.9 percent).

EXAMPLE 4

(a) Preparation of carboxylic acid-functional quaternary ammonium compound.

To a reactor containing about 129.8 parts of a carbinol-functional ammonium compound having the formula

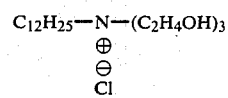

is added about 120 parts of succinic anhydride and heated at 100° C. for 10 hours. The resultant quaternary ammonium compound has a chloride content of 5.1 percent (calculated 5.7 percent). It has a nitrogen content of 2.0 percent (calculated 2.2 percent), and an acid content of 0.5 milliequivalents/g (calculated 0.5 milliequivalents/g).

(b) Preparation of quaternary ammonium-functional silicon compound.

To a reactor containing 247 parts of the carboxylic acid-functional quaternary ammonium compound prepared in accordance with Example 4(a) above is added 5,664 parts of a carbinol-functional polydimethylsiloxane represented by the formula

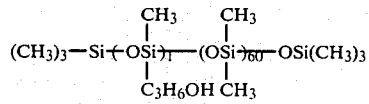

and heated at 100° C. in vacuum for 18 hours. About 20 parts of water is collected in a flask cooled in dry ice. The resultant product is a viscous, amber liquid having a nitrogen content of 0.09 percent (calculated 0.09 percent) and a chloride content of 0.2 percent (calculated 0.24 percent).

EXAMPLE 5

(a) Preparation of carboxylic acid-functional quaternary ammonium compound.

To a reactor containing 300 parts of a carbinol-functional quaternary ammonium compound having the formula

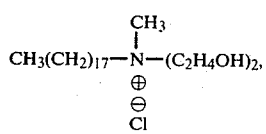

is added 210 parts of phthalic anhydride and 925 parts of xylene and heated for 10 hours at 100° C. The resultant solution is an amber liquid having an acid equivalent of 0.95 milliequivalents/g (calculated 0.99 milliequivalent/g).

(b) Preparation of quaternary ammonium-functional silicon compound.

To a reactor containing 510 parts of the carboxylic acid-functional quaternary ammonium compound and 925 parts of xylene prepared in Example 5(a) above, is added 3445 parts of a carbinol-functional polydimethylsiloxane having the formula

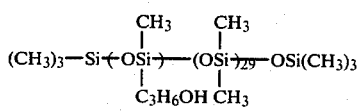

and refluxed until about 24 parts of water are azeotroped off. The product is vacuum stripped at 150° C. for 3.0 hours to remove the xylene. The resultant liquid product has a nitrogen content of 0.2 percent (calculated 0.25 percent), and a chloride content of 0.59 percent (calculated 0.64 percent). Infrared analysis indicates that the product is a quaternary ammonium-functional silicone fluid.

EXAMPLE 6

(a) Preparation of carboxylic acid-functional quaternary ammonium compound.

The procedure of Example 5(a) is repeated except that 309 parts of a carbinol-functional quaternary ammonium compound having the formula

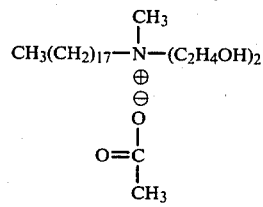

is substituted for the carbinol-functional quaternary ammonium compound prepared in Example 5(a). The resultant solution is an amber liquid having an acid equivalent of 1.0 milliequivalents/g (calculated 0.98 milliequivalents/g).

(b) Preparation of quaternary ammonium-functional silicon compound.

The procedure of Example 5(b) is repeated except that the carboxylic acid-functional quaternary ammonium compound prepared in accordance with Example 6(a) is substituted for the carboxylic acid-functional quaternary ammonium compound prepared in Example 5(b). The resultant liquid product has a nitrogen content of 0.23 percent (calculated 0.25 percent) and an acetoxy content of 0.94 percent (calculated 1.06 percent) as determined by Nuclear Magnetic Resonance analysis.

Infrared analysis shows that the product is a quaternary ammonium-functional polydimethylsiloxane.

EXAMPLE 7

(a) Preparation of carboxylic acid-functional quaternary ammonium compound.

The procedure of Example 5(a) is repeated except that 839 parts of a carbinol-functional quaternary ammonium compound having the formula

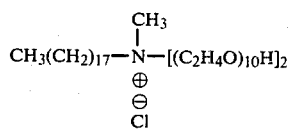

is substituted for the carbinol-functional quaternary ammonium compound prepared in Example 5(a). The resultant amber colored solution has an acid equivalent of 0.8 milliequivalents/g (calculated 0.72 milliequivalents/g).

(b) Preparation of quaternary ammonium-functional silicon compound.

The procedure of Example 5(b) is repeated except that the carboxylic acid-functional quaternary ammonium compound prepared in Example 7(a) is substituted for the carboxylic acid-functional quaternary ammonium compound prepared in Example 5(a). The resultant liquid product has a nitrogen content of 0.18 percent (calculated 0.22 percent) and a chloride content of 0.48 percent (calculated 0.56 percent). Infrared analysis indicates that the product is a quaternary ammonium-functional polydimethylsiloxane.

EXAMPLE 8

The procedure of Example 5(a) is repeated except that glutaconic anhydride is substituted for the phthalic anhydride. A carboxylic acid-functional quaternary ammonium compound is obtained.

The resultant carboxylic acid quaternary ammonium-functional compound is then reacted with the carbinol-functional polydimethylsiloxane in accordance with the procedure described in Example 5(b). A quaternary ammonium-functional polydimethylsiloxane is recovered.

EXAMPLE 9

The procedure of Example 5(a) is repeated except that 1,2-cyclohexane dicarboxylic anhydride is substituted for the phthalic anhydride. A carboxylic acid-functional quaternary ammonium compound is obtained.

The resultant carboxylic acid-functional quaternary ammonium compound is then reacted with the carbinol-functional polydimethylsiloxane in accordance with the procedure described in Example 5(b). A quaternary ammonium-functional polydimethylsiloxane is recovered.

EXAMPLE 10

The antistatic properties of the quaternary ammonium-functional silicon compounds prepared in the above Examples are determined by applying a 5 percent solution of the compounds prepared in the above Examples in 2-propanol on 100 percent polyester fabric. The treated fabric is dried for 60 seconds at 175° C. The surface resistivity of the treated fabric is shown in the following table.

| Composition Example No. | Fabric | Surface Resistivity Ohms |
| --- | --- | --- |
| 1 | Dacron T-54 | $1.75 \times 10^{10}$ |
| 2 | Dacron T-54 | $3.5 \times 10^{10}$ |
| 3 | Dacron T-54 | $2.5 \times 10^{10}$ |
| 4 | Dacron T-54 | $3.5 \times 10^{11}$ |
| 5 | Dacron T-54 | $2.4 \times 10^{10}$ |
| 6 | Dacron T-54 | $2.7 \times 10^{10}$ |
| 7 | Dacron T-54 | $9.5 \times 10^{9}$ |
| 8 | Dacron T-54 | $2.25 \times 10^{10}$ |
| 9 | Dacron T-54 | $3.25 \times 10^{11}$ |
| None | Dacron T-54 | $1.02 \times 10^{15}$ |

What is claimed is:

1. A quaternary ammonium functional silicon compound which is obtained from the reaction of a carboxylic acid-functional quaternary ammonium compound and a carbinol-functional silicon compound having at least one unit of the formula

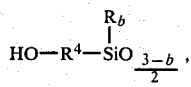

said carboxylic acid-functional quaternary ammonium compound is obtained from the reaction of a carbinol-functional quaternary ammonium compound selected from the group consisting of

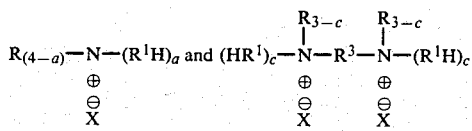

with a dicarboxylic acid or anhydride thereof, in which R is a monovalent hydrocarbon radical having from 1 to 22 carbon atoms, $R^1$ is a hydrocarbonoxy radical represented by the formula $(-C_nH_{2n}O)_r$, $R^3$ is a divalent hydrocarbon radical having from 2 to 10 carbon atoms, $R^4$ is a radical selected from the group consisting of saturated divalent hydrocarbon radicals and divalent hydrocarbonoxy radicals in which the oxygen is in the form of an ether linkage, X is an anion, a is a number of from 1 to 4, b is a number of from 0 to 3, c is a number of from 1 to 3, n is 2, 3 or 4, and r is a number of from 1 to 50.

2. The quaternary ammonium compound of claim 1, wherein the carboxylic acid-functional quaternary ammonium compound is obtained from the reaction of a carbinol-functional quaternary ammonium compound and a dicarboxylic acid.

3. The quaternary ammonium compound of claim 1, wherein the carboxylic acid-functional quaternary ammonium compound is obtained from the reaction of a carbinol-functional quaternary ammonium compound and a cyclic anhydride.

4. The quaternary ammonium compound of claim 1, wherein the carboxylic acid-functional quaternary ammonium compound is selected from the group consisting of compounds having the formulas

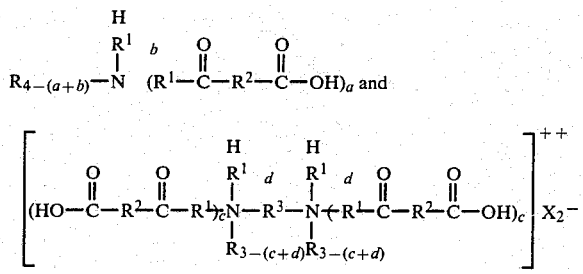

in which R is a monovalent hydrocarbon radical having from 1 to 22 carbon atoms, $R^1$ is a hydrocarbonoxy radical having the formula $-(C_nH_{2n}O)_r$, $R^2$ is a divalent hydrocarbon radical selected from the group consisting of $(CH_2)_y$, $CH=CH$ and a cyclic divalent hydrocarbon radical selected from the group consisting of $C_2H_4$, $C_4H_6$, $C_5H_8$, $C_6H_4$, $C_6H_8$, $C_6H_{10}$, $C_{10}H_6$, and a bicyclic radical selected from the group consisting of $C_7H_8$, $C_7H_{10}$, $C_8H_{10}$ and $C_8H_{13}$, $R^3$ is a divalent hydrocarbon radical having from 2 to 10 carbon atoms, X is an anionic radical, a is a number of from 1 to 4, b is 0, 1, 2 or 3, c is 1, 2 or 3, d is a number of from 0 to 2, in which the sum of a+b cannot exceed 4, and the sum of c+d cannot exceed 3, n is 2, 3 or 4, r is a number of from 1 to 50 and y is a number of from 0 to 10.

5. The quaternary ammonium compound of claim 1, wherein the carbinol-functional silicon compound contains at least one unit of the formula

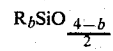

where R is a monovalent hydrocarbon radical having from 1 to 22 carbon atoms and b is 0, 1, 2 or 3.

6. The quaternary ammonium compound of claim 1, wherein the mole ratio of the carboxylic acid groups of the carboxylic acid-functional quaternary ammonium compound to carbinol groups or the carbinol-functional silicon compound is in the range of from 4:1 to 1:30 with the proviso that at least one carboxylic acid group is reacted with one carbinol group.

7. The quaternary ammonium compound of claim 1, wherein the carbinol-functional silicon compound is represented by the formula

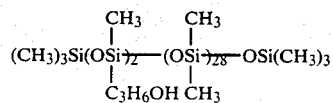

8. The quaternary ammonium compound of claim 1, wherein the carbinol-functional silicon compound is represented by the formula

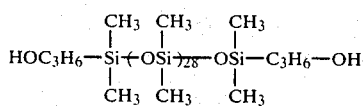

* * * * *